(12) United States Patent
Atkins et al.

(10) Patent No.: US 7,568,269 B2
(45) Date of Patent: Aug. 4, 2009

(54) POWER TOOL AND METHOD FOR CONNECTING FASTENERS TO BELTS

(75) Inventors: Mark R. Atkins, St. Charles, IL (US); William R. Wawczak, Glen Ellyn, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 371 days.

(21) Appl. No.: 11/466,321

(22) Filed: Aug. 22, 2006

(65) Prior Publication Data

US 2008/0052889 A1    Mar. 6, 2008

(51) Int. Cl.
    B23P 11/00    (2006.01)
(52) U.S. Cl. .................. 29/243.51; 29/432; 29/798
(58) Field of Classification Search ............. 29/243.51, 29/243.53, 798, 432; 227/51, 53, 61, 62, 227/110, 111, 147, 148, 155, 156
    See application file for complete search history.

(56) References Cited

U.S. PATENT DOCUMENTS

| | | | | | |
|---|---|---|---|---|---|
| 3,913,180 | A | * | 10/1975 | Pray | 24/31 B |
| 4,440,336 | A | * | 4/1984 | Kifor | 227/4 |
| 4,620,657 | A | * | 11/1986 | Gladding et al. | 227/147 |
| 4,688,711 | A | * | 8/1987 | Gladding et al. | 227/147 |
| 5,095,590 | A | * | 3/1992 | Schick | 24/33 B |
| 5,368,214 | A | * | 11/1994 | Schick | 227/147 |
| 5,487,217 | A | * | 1/1996 | Richardson et al. | 29/816 |
| 5,524,808 | A | * | 6/1996 | Vogrig | 227/147 |
| 5,544,801 | A | * | 8/1996 | Schick | 227/110 |
| 5,644,836 | A | * | 7/1997 | Schick | 29/798 |
| 5,906,038 | A | * | 5/1999 | Herold | 29/432.1 |
| 6,081,995 | A | * | 7/2000 | Herold | 29/798 |
| 6,311,393 | B1 | * | 11/2001 | Garner | 29/798 |
| 6,488,144 | B2 | * | 12/2002 | Winkelman et al. | 198/844.2 |
| 6,739,038 | B2 | * | 5/2004 | Herold | 29/798 |
| 7,493,682 | B2 | * | 2/2009 | Richardson et al. | 29/243.51 |

* cited by examiner

*Primary Examiner*—Essama Omgba
(74) *Attorney, Agent, or Firm*—Fitch, Even, Tabin & Flannery (57) ABSTRACT

A power operated belt splicing system is provided. In one form, staples are driven through a belt and clinched in a final set using a power driven tool and a force applying member having multiple drive punches. A lower force applying end on a punch preferably has a first portion to drive the staple and a second portion to drive a leading edge of the belt fastener against the belt thereby distributing the drive force over both the staple and the belt fastener. Preferably, the second surface is shaped similarly to the outboard edge of the upper plate. A pair of adjacent punches can substantially simultaneously drive two pairs of preset staples with each pair of preset staples being associated with one of a pair of adjacent hinged belt fasteners thereby attaching a pair of belt fasteners to a belt in a single operation. The initial and final staple set may be done with the same power tool.

16 Claims, 7 Drawing Sheets

POWER TOOL AND METHOD FOR CONNECTING FASTENERS TO BELTS

FIELD OF THE INVENTION

This invention relates to a belt splicing method, apparatus and an impact applying member for attaching belt fasteners of the hinged or plate kind to a belt carcass by driving connectors such as staples or rivets into and through a belt.

BACKGROUND OF THE INVENTION

This invention relates to a method and apparatus for connecting belt fasteners to conveyor belt ends by connectors such as rivets or staples. The invention is described hereinafter in connection with the attachment of hinged belt fasteners having an upper plate which is inclined upwardly to be spaced from the top surface of the belt prior to application thereto and a lower plate, the plates being attached to the belt by staples. However, the method and apparatus are also useable with plate fasteners which are separate plates which are not connected by a hinge portion and in which the top plate lays flat against the upper surface of the belt prior to application of the staples or rivets.

One manner of attaching belt fasteners to belt ends with staples is disclosed in U.S. Pat. Nos. 4,111,080 and 4,333,217. These patents disclose a staple guide block which is positioned over several fasteners for guiding an impact applying member that is manually driven by being hit by a mallet or hammer to drive the staples from the guide block into the holes of the upper plate and through the belt carcass into the holes in the underlying plate. There is an initial set or bending of the staple ends through about 45° by a first anvil. Then there is a second stage of the application procedure without the use of the guide block wherein the staples are hit directly by a hammer to do the final clinching or bending over of the ends of the staples by a second anvil to tightly engage the lower surface of the lower plate of the belt fasteners.

A particular problem with the use of these manually operated fastener systems, which do not use a motor drive to supply the force at least through the initial set of application, is that of fatigue of the operator. More specifically, if the operator has to do very wide belts or has to do a large number of belt splices, the swinging of the relatively heavy mallet or hammer to penetrate the belt to initially set the staple and/or a second swinging of the heavy mallet to do the final set of the staple ends may result in considerable operator fatigue.

Additionally, the speed of operation for a manual initial set and a final clinching set operation is limited such that there is a need for a faster system. Some prior systems have proposed power or motor driven tools rather than a manually swung mallet to force the staple ends through the belt for the initial setting of the staples ends. In one of these systems, the operator lightly taps the tops of a hinge type belt fastener to compress the upper plate against the top of the belt so as to be substantially in a horizontal plane with the upper, top surface of the belt. A fixture or staple guide is fitted on the tool base and is located relative to the belt fastener and is used to guide the staple which is power driven through the staple guide and the belt to cause the lower ends of the staples to be bent by an underlying anvil into an initial set. One staple at a time is driven and it is necessary to reposition the tool and gun for each staple location. Where two staples are used for each belt fastener, this will require a repositioning of the staple power motor driven gun of this system twice in order to drive both of these staples for this single fastener into the belt to accomplish the initial set operation. After all of the staples have been initially set, the staple guide is removed from the tool and a gauge pin is inserted into the fastener loops. The final or clinching of the staples can be either done manually with a hammer or by using a different, hydraulic tool. Thus, the above system fastens only a single staple at a time and uses a different tool to accomplish the final setting operation.

There are manual systems that use an impact applying member which drives multiple staples with the single impact applying member having multiple punches, but this system is laborious and slow (see the '080 patent and U.S. Pat. No. 4,688,711 for rivet connectors). Another similar prior system shown in U.S. Pat. No. 5,524,808 also has an impact applying member for rivet connectors. In this system, a power tool applies the drive force to the impact applying member. However, after actuation of the tool for a rivet driving operation, the tool and then the separate impact applying member have to be moved separately from each other to the next set of guide bores and associated rivets for the next rivet driving operation with this sequence of operations repeated until the belt splice is complete. As is apparent, the separate tool and impact applying member requires time and labor for removing the tool from the impact applying member, removing the punches or prongs of the impact applying member from the guide bores, placing the punches in the next set of guide bores and then aligning the tool back over the impact applying member before the tool is actuated.

In another prior system that is commercially available, a pneumatic gun or tool has a staple and staple magazine and a lower guide block attached to the lower end of the pneumatic gun. The lower guide block carries pins that fit into alignment holes for an anvil base to align the power driven drive rod against the staple. The staple may be driven once by the pneumatic drive tool to initially bend or set a single staple. After the operator performs the initial set driving of the staple ends, a final manual setting operation using a hammer accomplishes the clinching of the staple ends. In this system, only a single staple is driven so that staples are applied one at a time, and the staples sometimes jam in the gun and the drive rods are subject to breaking. The final manual staple setting operation requires set-up time and manual labor in generating the final set force slowing the process for completing the belt splicing operation.

In stapling of a belt fastener to a belt, the staple is driven into a cup-shaped recess in the fasteners upper plate which receives the head of the staple. The legs depending from the head of the staple are driven through a pair of holes separated by a thin piece bridge in the upper plate recess, and the bridge may be broken if too much force is applied to it. Also, the staple head may be damaged if too much force is applied to it. Excessive force from a power drive tool may also create a dent or dip in the front edge portion of the inner fastener plates. It is desirable to drive the staple without any denting, marring or marking of either the staple or the fastener itself. The likelihood of such damage is increased in applications in the field such as coal mines or construction sites where pneumatic pressure may be unregulated or fluctuates considerably, e.g., between 65 to 100 psi, and hence the force generated and applied to the staple and fastener may be larger than desired potentially causing damage to the staple or belt fastener, or both.

In some instances the guide block is attached to the power gun itself and in other instances the guide block is separate from the power gun. A lean or inclination of the gun relative to the staple may cause a misfire. This results because the staples are initially at an incline to the vertical and the upper plate is not horizontally disposed when the belt end is inserted between the fastening plates. Thereafter, if the gun is not properly aligned with the inclined staple, the upper part of the staple may be folded over such that the lower staple end legs do not penetrate the belt to pass through the holes in the bottom plate, which is termed a "misfire." Another type of misfire occurs when the staple legs are not driven straight through and into the holes in the bottom plate and are deflected or bent by the engagement with the bottom plate rather then passing through the holes in the bottom plate. Although the guide blocks provide a general guide of the power driven tool, there still can exist a particular inclination or lean of the gun, particularly a lean in one leaning direction versus another leaning direction, that may cause a misfire. For a commercially successful system, the number of misfires must be minimal.

From the foregoing it will be seen that the prior commercial belt fastening systems have a number of shortcomings and problems, not all of which are discussed above. Also, it will be seen that there is a need for a faster belt fastener attaching system to address the shortcomings and problems of the prior systems.

SUMMARY OF THE INVENTION

In accordance with one form of the present invention, an improved power driven, fastener splicing system is provided for driving connectors such as staples or rivets into a conveyor belt with a power drive and a force applying member. In a preferred form, connectors are staples; multiple staples are driven simultaneously and the front edge of the belt fastener is forced down against or into the belt carcass with a drive force from the force applying member. When the connector is a staple and the belt fastener has a hinge between its upper and lower plates, the motor actuator is used to drive a force applying member having at least one punch to drive the staple through the belt and also to apply force to the upper plate to distribute the drive force over both the staple and the upper plate of the belt fastener. The drive force on the upper plate compresses the upper plate's front edge against or into the belt for more secure fastening and to assure that there is not a raised front edge of the fastener for a belt scraper or cleaning blade to abut during a belt scrapping operation. Because not all of the drive force is concentrated on the head of the staple, the staple is less likely to be marred or overdriven. Stated differently, it is preferred that the full drive force from the punch is distributed between the belt fastener, per se, and the connector such as the staple being driven to connect the fastener to the belt rather than being applied solely to the staple head.

In accordance with one form, the force applying engagement end on the force applying member is provided with increased area to engage not only the staple head but also to engage directly the front outboard edge of the belt fastener to push and drive this front edge into the carcass to generate a good splice. In the preferred form, the area of a punch of the force applying member may be increased with an extra portion on its end to provide a surface that engages and pushes down the outboard edge of the upper fastener plate. The preferred punch drive surface is profiled with a depending extra portion that protrudes below the connector driving portion of the punch end. Also, the preferred protruding portion may be contoured to substantially match the contour of the outboard edge of the belt fastener to assist in directing the driving force to push this fastener end into the belt carcass.

In accordance with another aspect, the belt splice may be made quickly using a motor driven, force applying member having multiple punches for driving simultaneously driving multiple connectors such as may be associated with a single belt fastener into the belt carcass rather than having to drive each of the connectors individually one at a time, which is a slower process for making a belt splice. In the preferred embodiment, four staples are driven simultaneously by a fluid motor having an impact applying member with two punches, each punch spanning and driving two staples that are pre-set in an upper plate of a hinge fastener. In this manner, a single operation of the preferred power tool herein causes staple attachment of a pair of adjacent belt fasteners to the belt in contrast to individual driving of a single staple when using one of the above-described, power-assisted, prior systems.

In accordance with a further aspect, a reduction in manual labor is provided by using the same force applying member and motor drive gun tool for doing both the initial, partial bending of the staple legs and then a final bending of the staple legs into their parallel, final clinching position. This eliminates the prior art manual hammering for the final bending of the staple legs used in some prior systems or the use of another separate tool such as a hydraulic pressure tool for the final staple bending and clinching operation. Thus, multiple staples can be attached using a single power driven tool with multiple punches resulting in a faster and less labor intensive system.

Because the drive rod of the power tool splits or distributes the driving force by applying a first portion of the driving force to the connectors and by applying a second portion of driving force directly to the belt fastener, the system avoids overdriving of the connector and/or dishing of the fastener front edge portion. Additionally, the system is capable of handling substantial variations in fluid pressure of the fluid being supplied to the motor drive because of the distribution of the drive force between the connectors and the fastener plate. For example, this splitting of the drive force allows accommodation of a large variation in pneumatic pressure such as between 65 psi to 100 psi. A preferred air pressure range for driving four staples with the preferred two punches is a pneumatic gun running at 75 psi to 80 psi.

Another aspect of the invention relates to overcoming the problem of misfire such as a misdriving of the connectors such as staples when the motor driven gun is tilted, i.e., leans relative to the vertical in a direction that may fold over the head or upper bridge of the staples because the staple legs are being driven at a slant so that the pointed ends of the staple legs are misaligned with the holes in the bottom plate of the belt fastener after the staple legs have penetrated through the belt. This misdriving or misfiring problem may be substantially alleviated by profiling the engagement end of the force applying member with a curved impact surface that slides along the staple bridge and drives the staple legs straight into the holes in the underlying plate of the belt fastener even through the motor driven gun is tilted relative to the staple.

In accordance with another aspect, the safety trigger for motor operation comprises a projecting member on the guide blocks for insertion into an opening of the motor drive to enable the motor drive to provide the drive force to the connector and to position the force applying member so that the drive surface is properly oriented relative to the connector and belt fastener. More specifically, in the one preferred form where the connectors are staples, the drive surface is oriented such that the depending impact surface portion is aligned to drive the outer end of the belt fastener rather than to drive the staples or some other portion of the fastener. At any other orientation of the motor drive relative to the guide bores in the guide blocks, the safety will not be actuated and therefore the motor drive cannot be operated to drive a connector. The preferred safety is disposed interiorly with its lower end located above the lower end of the bore so as to not to be easily operated until the projection on the guide block or fixture is aligned and inserted into the bore. Only then will operation of a gun trigger cause a stapling action with the gun.

DETAILED DESCRIPTION OF THE PREFERRED EMBODIMENTS

Figure 1:
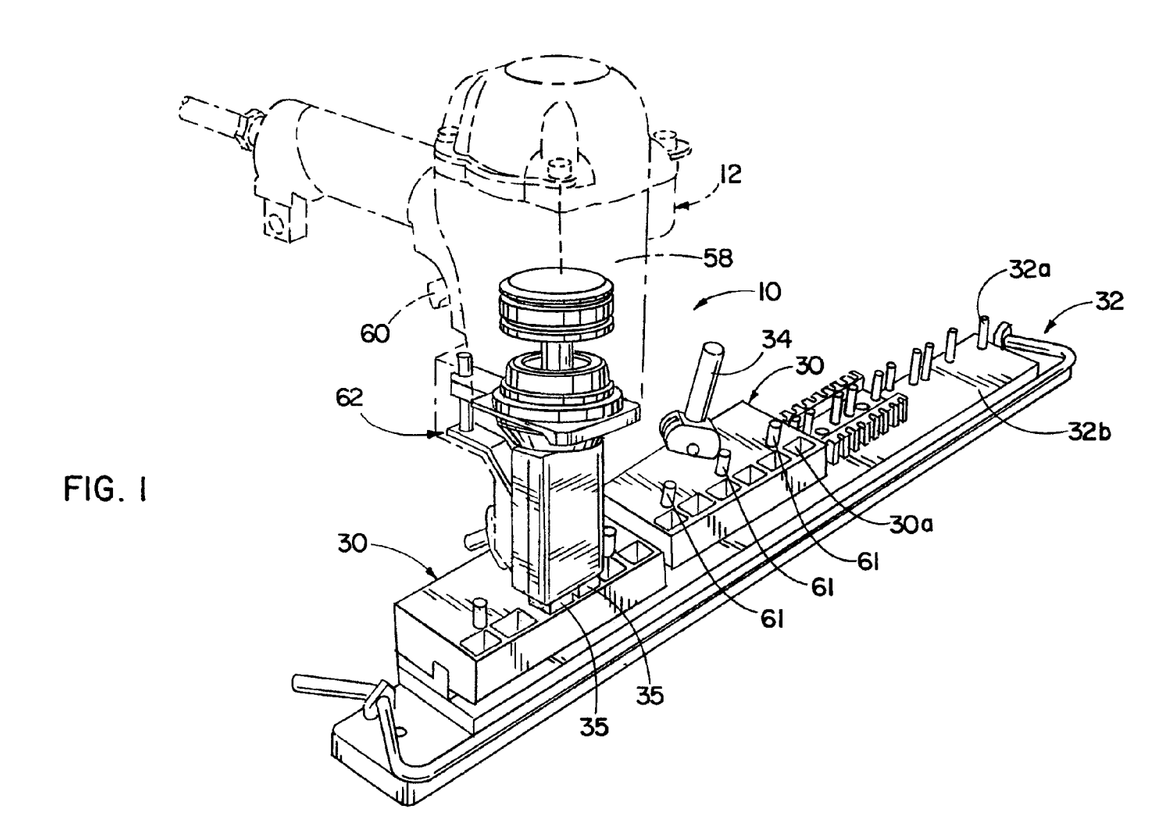
FIG. 1 is a perspective view of the illustrated embodiment of a belt splicing system using a motor driven apparatus in accordance with one embodiment of the invention.
Figure 2:
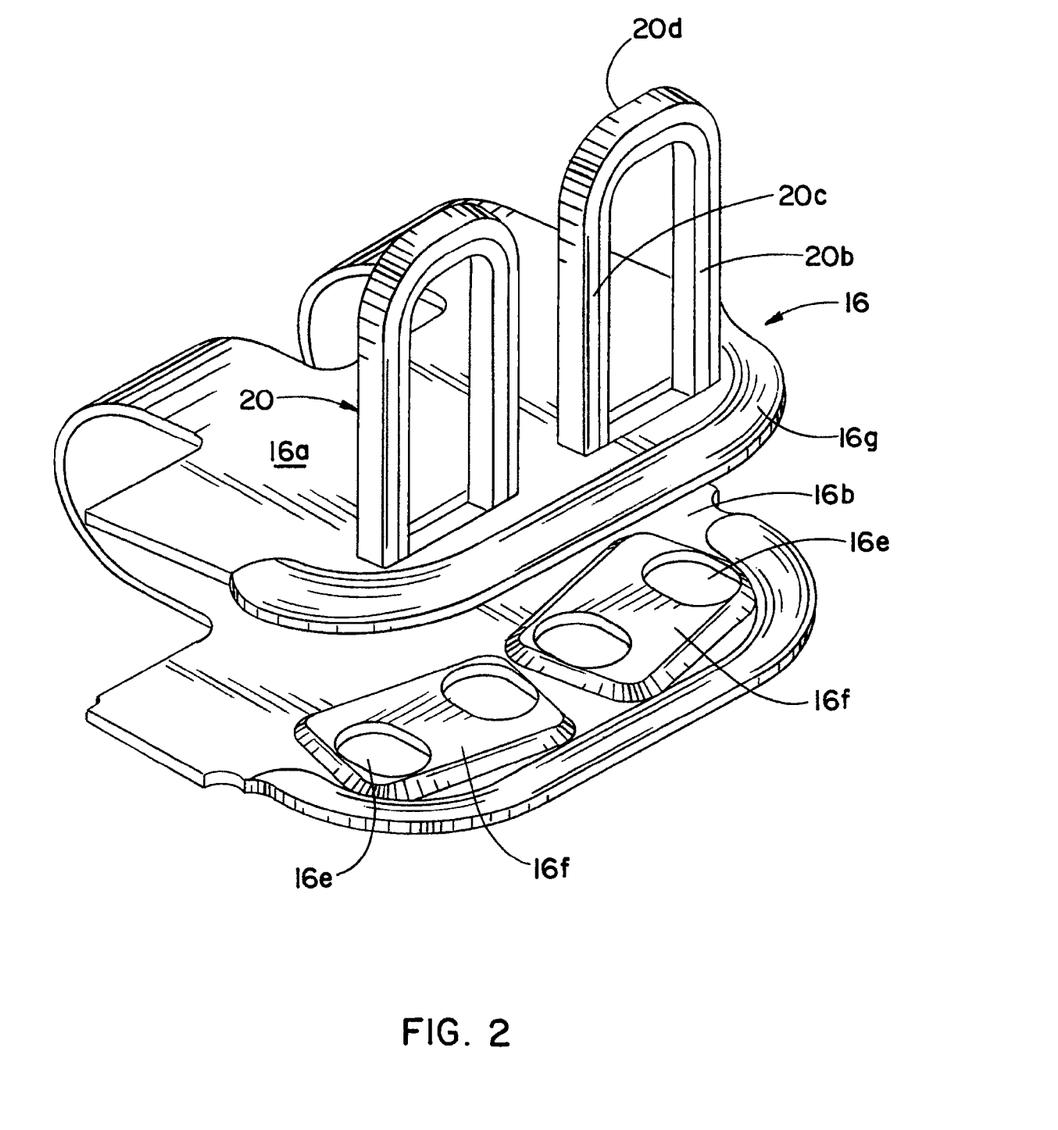
FIG. 2 is an illustration of a prior art belt fastener having a pair of preset staples thereon.
Figures 8, 9:
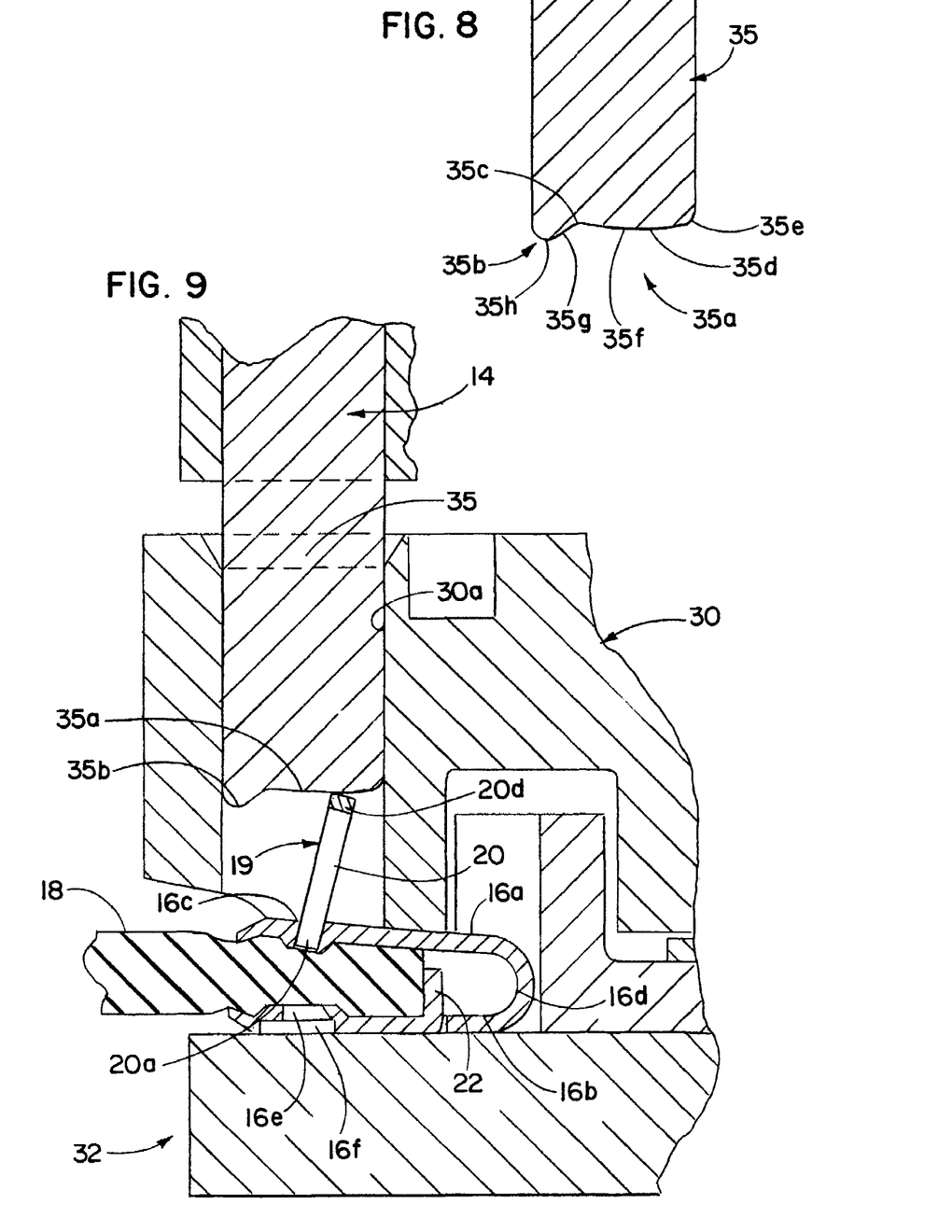
FIG. 8 is an enlarged, cross-sectional view of a force applying surface on a punch constructed in accordance with the illustrated embodiment.
FIG. 9 is an enlarged, cross-sectional view of the punch, staple and belt fastener at the beginning of the stapling operation.

In accordance with the illustrated embodiment, there is provided a power driven tool or apparatus 10 including power drive or motor 12 for driving a force or impact applying member 14 to fasten belt fasteners 16 such as shown in FIG. 2 to a conveyor belt 18 (FIG. 9) with connectors 19 such as staples 20. The staples 20 have lower ends 20a for piercing the belt carcass which are then bent to initially clasp or grip the upper and lower plates 16a and 16b to the belt. The belt is usually precisely positioned either by internal belt stop 22 on the belt fastener such as shown in FIG. 9 or by other belt stopping surfaces on an anvil tool 32. As disclosed in U.S. Pat. Nos. 4,111,080 and 4,333,217, a guide block assembly (FIGS. 1 and 5) comprising a series of guide blocks 30 is positioned on the anvil device via locating posts 32a thereof to receive an end of a belt with the connectors such as staples being precisely located relatively to a lower anvil plate 32b which bends the ends of the staples or rivets. The guide blocks are locked against the belt, which has been inserted between the fastener upper and lower plates 16a and 16b, by a pair of handle operated, cam locks 34 (FIG. 1) which are pivotally mounted to force the guide block downwardly to lessen the inclination to the horizontal of the upper plates of the belt fasteners.

Figure 15:
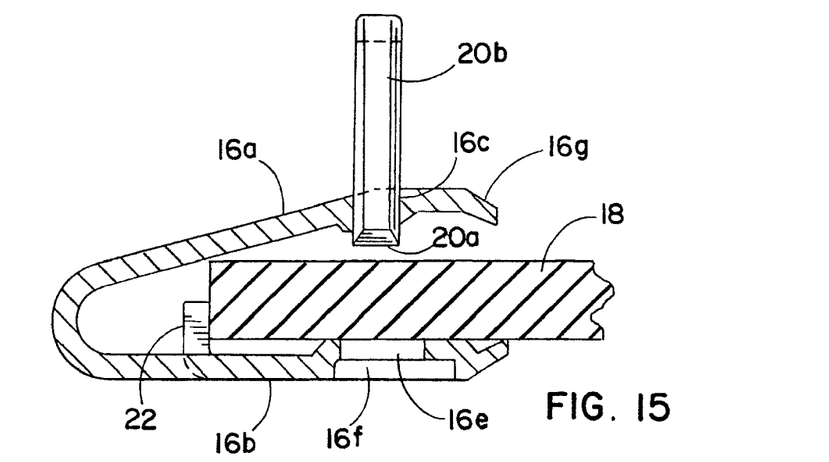
FIG. 15 is a cross-sectional view showing the hinged type belt fasteners having preset staples with a belt end inserted therein prior to use of the power tool.

In the embodiment illustrated herein, the illustrated belt fasteners 16 are provided with prestaked staples 20, as best seen in FIGS. 2 and 15, in which the staples are positioned with staple legs 20b and 20c held in the apertures or holes 16c in the top plate 16a. In this manner, when the guide block 30 is positioned against the top plate of the belt fastener, the staples will automatically be positioned within the vertical holes or bores 30a (FIG. 9) in the guide block 30. It should be appreciated that the present invention is not limited to the use of the illustrated staple whether they are preset on the fastener or are separate and individually loaded into the guide block bore as described heretofore when driven with a manual operation as described in the aforementioned U.S. Pat. No. 4,333,217. Also, the staples may be fed from a magazine carried by the motor gun as is used in some prior systems. Moreover, the present invention is also directed to a power driven operation for belt fasteners that have separate upper and lower plates so that they do not have a U-shaped hinge portion 16d at the rear thereof as typical of a hinge-type belt fastener illustrated in FIG. 2. Additionally, the power driven tool system herein described may also be used to drive rivets (not shown) through the belt and to form the rivet ends at the lower ends of the rivets to clinch a belt fastener to the belt. The rivets may include attached pilot nails for piercing the belt so that the term rivets includes these rivet and nail assemblies as well.

The power drive apparatus 10 of FIG. 1 includes the power actuator or motor 12 and the force applying member 14 for driving the staples 20. The force applying member which is positioned over the top of staple heads or bridges 20d and provides a driving force to the bridges to drive the pointed ends 20a of the staples through the belt 18 and into the underlying aperture or hole 16e in the lower fastener plate 16b and then against the underlying anvil surfaces that bend up the lower ends of the staple legs. While it is possible in some applications to bend the staple legs toward each other into the generally horizontal position shown in FIGS. 11 and 12 in one operation, in the present invention there is an initial setting operation or stage in which the pointed ends of the staples are driven through the belt and into the anvil which deflect the legs to a deflectant angle that does not fully set the legs into the parallel position, but only partially bends, for example, about half way from the horizontal. That is, the bent legs are visibly protruding below the lower surface of the lower plate rather then being bent back parallel and to fully reside in a cavity or cup 16f (FIG. 9) formed in the lower plate on the underside of the fastener leg. The final setting of these bent staple legs involves bending the lower ends of the legs into the parallel relationships within the recessed cups 16f formed in the lower fastener plate, preferably by using a different anvil plate and a second application of force to the staples by the same power driven, force applying member 14.

Another problem with staples is the over-driving thereof in which the bridge 20d between the staple legs 20b and 20c may be broken or marred in some instances because the bridge was hit with excessive force. Moreover, another problem that may be encountered when using a fluid motor drive particularly such as a pneumatic drive wherein the air pressure, particularly on site locations such as a mine or construction site that the available air pressure may not be closely regulated by a power regulator, may vary significantly. For example, variations anywhere from 65 to 100 psi are common in some places particularly underground or in other places in which the usual supply source of air is unregulated or erratic. The present invention is not limited to the use of pneumatic motors, as described in the illustrated embodiment, because the driver and motor may be separate. For instance, an electric drill or the like or a hydraulic motor may be used to drive a transmission or gear arrangement having an input shaft driven by the electric drill with an internal drive that impacts the impact applying member and punches to drive the staples. Also, an electric motor may be provided to provide the motor drive force for the power tool.

The term "force applying member 14" as used herein, is intended to be generic, i.e., to cover not only the drive force generated by a quick acting piston which delivers an impact blow or drive force, but also to cover a slow acting, steadily applied and increasing pressure or drive force from a hydraulic, mechanical, electrical or other power actuator used to push the punch on the force applying member with sufficient force to drive the connector through the belt and to at least partially form a rivet head on a rivet connector or bend the staple legs of a staple on an anvil surface. Hereinafter, the term "impact applying member 14" is used to denote the impact blow from the member 14 via the pneumatically driven piston.

Figures 6, 7:
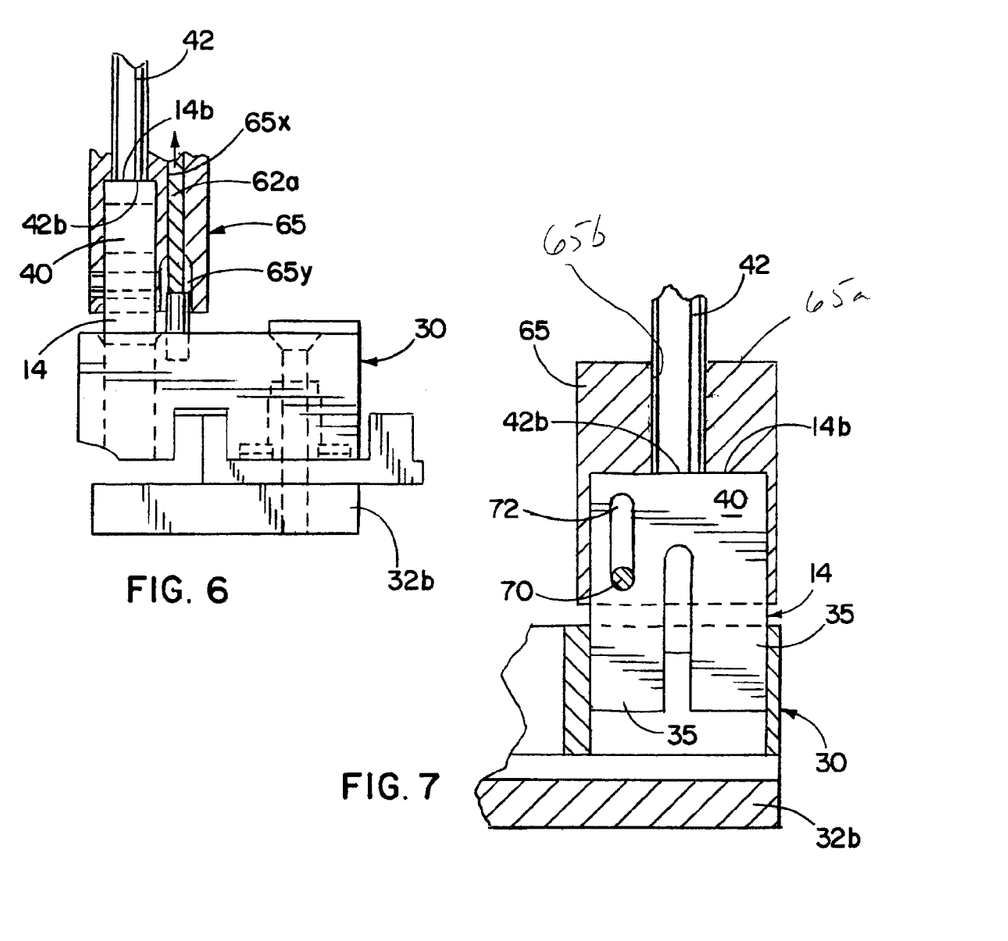
FIG. 6 is a side elevational view partially broken away showing the force applying member and the safety actuator.
FIG. 7 is a cross-sectional view of the force applying member and a retention slot and retaining pin for retaining the force applying member on the power actuator.
Figure 10:
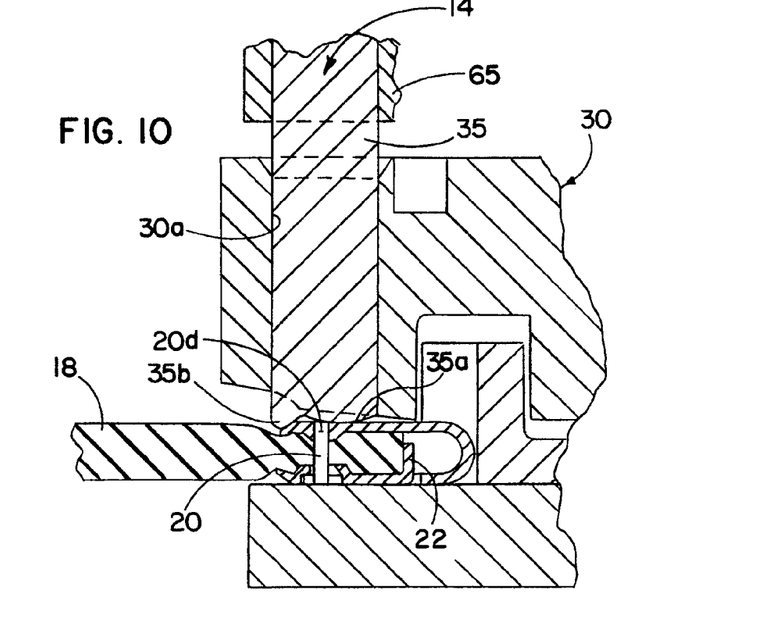
FIG. 10 is an enlarged, cross-sectional view of the punch performing a final clinching of the staple.
Figure 11:
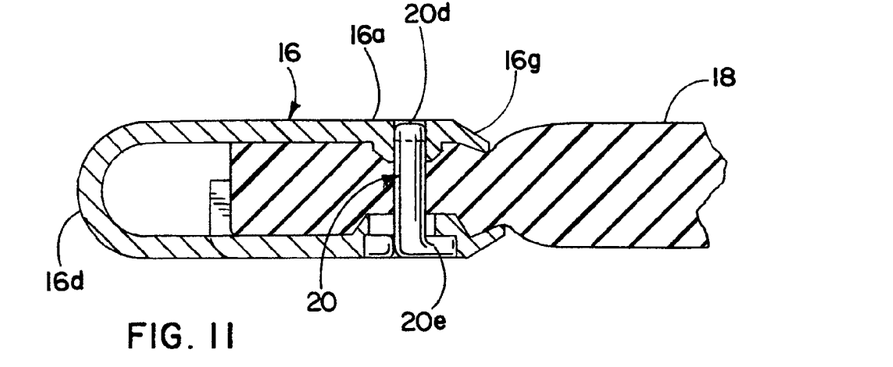
FIG. 11 is an enlarged, cross-sectional, side view of a clinched staple, belt and belt fastener.

In accordance with one aspect of the illustrated embodiment, an improved splicing system is provided for simultaneously driving all of the connectors such as two staples 20 for a belt fastener 16 having two preset staples or for driving four preset staples for a pair of adjacent belt fasteners thereby increasing the speed of the operation of the belt splicing from the single staple drive for a single fastener used in the prior art. An improved splice operation is also achieved in the illustrated embodiment by having impact applying punches or punch portions 35 of the impact applying member not only impact the staple but also impact the upper plate 16a and thus distribute the impact force from the motor actuator 12 over both the staple head 20d and the upper plate. Herein, the impact on the upper plate is directed to bend and compress a front edge 16g (FIGS. 9 and 10) of the upper plate 16a into the belt 18 by a second portion 35b of the lower end of the punch which directly engages the front edge 16g of the belt fastener to compress the same into the belt as best seen in FIGS. 6 and 10. More specifically, as shown in FIG. 10, a first portion 35a of the lower end of the punch engages the staple head and the lower protruding second portion 35b on the punch engages the leading edge 16g of the upper plate to compress the same into the belt. In other words, the first portion 35a is raised or recessed upwardly relative to the depending, protruding portion 35b of the punches 35 so that the first portion 35a will still be engaging the staple head 20d as the second portion 35b pushes the outboard edge 16g of the upper plate 16a down. Accordingly, with the staple head 20d oriented, for example, to extend substantially parallel to the plate edge 16g as illustrated, the punch portion 35b engages the fastener plate 16a at a position forwardly of the line along which the staple extends and the legs pierce the belt so as to exert a bending force on the plate 16a thereabout thereby urging the outboard edge 16g to bite against the belt, as shown in FIGS. 10 and 11.

By providing the first and second portions 35a and 35b on the drive surfaces of the punches 35 of the impact applying member 14, there is provided an increased area to engage not only the staple 20 but the belt fastener 16 itself so that there is a distribution of the force such that the impact force does not mar or break the bridge 20d of the staple during the staple driving and clinching operation. In the preferred embodiment, as best seen in FIG. 10, the lower edge of the second portion of the punch is configured to substantially match the contour or configuration of the outboard edge 16g of the upper plate 16a of the belt fastener. More specifically, as best seen in FIGS. 9 and 10, the second portion is a protrusion which has a slanted surface which is similar to the slanted surfaces on the coined belt fastener outermost edge 16g and the protrusion extends downwardly to bend the edge into the belt carcass as the contoured first surface 32a engages the staple bridge and does the final staple setting operation.

In accordance with another aspect, the impact surface of the punch 35 used to drive the staple head is configured to overcome the misalignment problem in that it is profiled with a rounded or curved surface which causes the staple 20 to travel straight through the belt 18 and into the holes 16e in the lower plate 16b of the belt fastener without misfiring.

The illustrated apparatus having impact applying members 14 with multiple punches 35 with profiled ends has been found to handle substantial variations in the fluid pressure of the fluid being supplied to the actuator motor 12. In mines or in other construction activities, there may be available pneumatic, compressed air with or without a regulator for closely controlling the air pressure such that they might be a large variation in a pneumatic pressure such as between 65 psi to 100 psi, as previously mentioned. Because the impact force delivered by the punch is distributed between the staple 20 or other connector and the belt fastener 16, these variations may be usually accommodated without marring or a fracturing of the connector, and specifically the bridge 20d on the staples.

Figure 3:
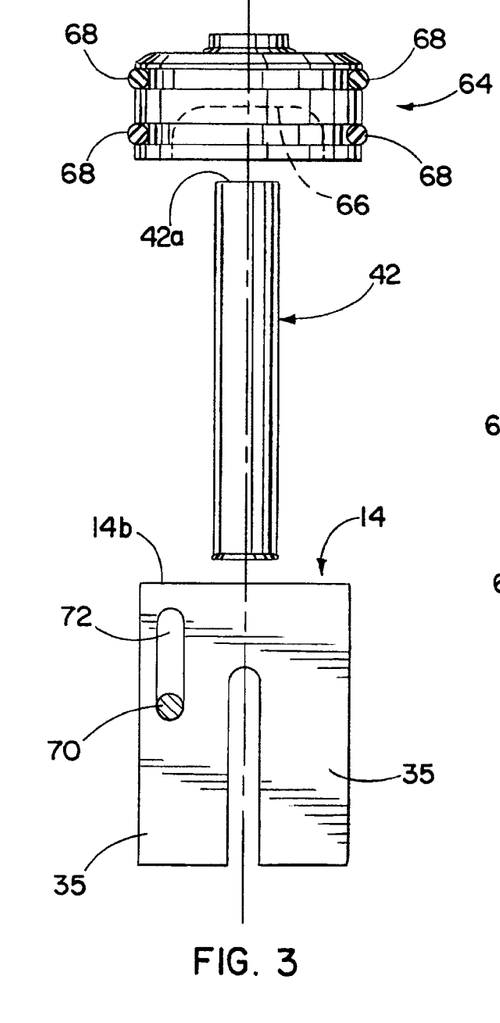
FIG. 3 is a side elevational view of a piston, drive rod and force applying member in accordance with the illustrated embodiment.

As best seen in FIG. 1, the preferred impact applying member 14 has a pair of punches 35 each disposed in a guide 30 having three pairs of adjacent guide bores 30a for attaching two belt fasteners 16 to a belt 18 with each fastener having two prestaked staples 20. The impact applying member 14 includes a main body 40 having an upper impact or force receiving end 14b which is a flat surface and receives an impact blow or driving force from a separate drive rod 42, which is a separate discrete element from the internal piston 64 disposed within a cylinder of the power actuator 12. As best seen in FIGS. 3 and 7, the impact applying member has two punches 35 extending down from a lower end of the main body 40, each positioned and spaced so as to enter a guide bore 30a in a guide block 30 so as to simultaneously drive a pair of adjacent staples. Herein the drive or impact surfaces on the lower end of each punch are configured to engage and impart a driving force directly to a pair of staples and to also drive both of the belt fastener outermost edges 16g tightly against the belt carcass. The preferred configuration is that having the first portion 35a for engaging the staple as best seen in FIG. 10 and the lower protruding second portion 35b for engaging the outer edge of the upper plate of the belt fastener. Impact surfaces of the first portion and the second portion are related to each other preferably so that they simultaneously engage both the connector and belt fastener once the staple bridge 20d is driven down adjacent the upper plate to distribute the impact force over both the connector and the belt fastener.

Although the preferred, contoured surfaces shown and described above for the impact end of the driving rods are provided to provide a wider area, less eccentricity, limit overdriving of the staples, reduce the need to have a closely metered air pressure, and prevent concentration of load on the staples, it is possible to provide flat surfaces rather than contoured surfaces to drive the staples using a drive rod with flat lower ends. A rounded or curved surface for the first portion 35a is preferable because the curved surface engages the staple head and drives the same with a large component of downward force and will slide along the staple head forwardly or rearwardly relative to the fastener if the power actuator is at a lean angle relative to the staple without bending the staples backward thereby resulting in a misfire.

Figure 12:
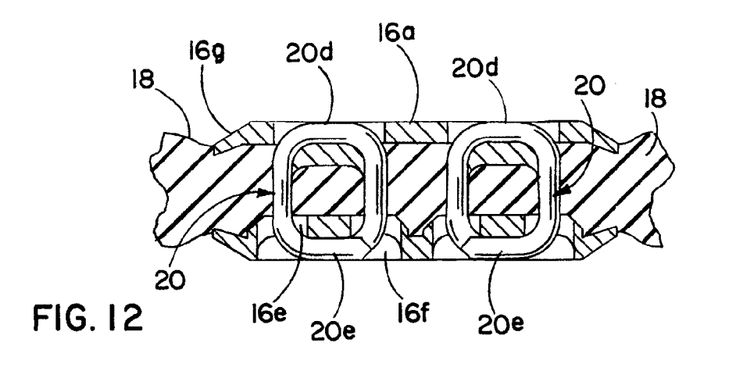
FIG. 12 is a front cross-sectional view of the finished belt splice of FIG. 11 showing a pair of clinched staples.

The driving of the leading edge 16g of the upper plate 16a of the belt fastener into the belt as seen in FIGS. 11 and 12 is particularly important for the splice so that a belt scraper (not shown) used with the conveyor belt for scraping material from the belt does not hit an upraised leading edge on the fastener and apply a lifting force thereto and eventually cause a failure because the repeated striking of the scraper blade against the leading edge of the belt fastener tending to pull the splice apart and break the fastener. Additionally, a simultaneous attaching of two belt fasteners by a pair of punches results in a spreading of the impact load from the impact applying member over the front edges of two belt fasteners and thereby avoids a dishing or marring of the front, leading edge 16g of the respective belt fasteners. In the illustrated embodiment, each of the two punches 35 on the impact member drives two staples at a time so that four staples 20 of two fasteners 16 are driven simultaneously upon operation of the tool 10 herein.

From the foregoing it would be seen that the method of fastening the belt fasteners having upper and lower plates 16 and 16b with multiple staples 20 includes using a motor driven, impact applying member 14 having multiple punches 35. The method further includes placing at least one belt fastener 16 on a belt end and aligning the guide 30 having multiple guide bores with the belt fastener or belt fasteners prior to operating the motor actuator 12. The motor actuator 12, such as of a pneumatic gun, is operated for simultaneously driving the impact applying member 14 and its multiple punches 35 to impact each of the connectors being engaged by a punch to cause the lower ends of the connectors to penetrate through the belt and through the holes 16e in the lower plates 16b of the belt fastener and to bend or otherwise form the lower ends of the connectors, such as bending staple end portions 20e into a bent shape or forming rivet heads on the bottom of the rivets.

In one preferred method, speed of generating a belt splice is increased by retaining the punches with the tool so that after connectors have been applied to the belt, the tool and punches are shifted together to the next set of guide bores and connectors for applying a drive force thereto. In the preferred method, each of the punches may also drive the front edge 16g of the hinged belt fastener downwardly with its second portion 35b while its first portion 35a is driving a one or more staples into and through the belt carcass. In another preferred method, there is a partial bending of the staple ends during an initial set. Thereafter, a second anvil surface is placed beneath the partial bent staple ends and then using the same tool 10 including the motor actuator and impact applying member thereof, the tool 10 is actuated a second time to finish bending the initially bent staple ends to clinch the staple ends into the cup 16f in the bottom plate with the bent staple ends extending substantially parallel to the bottom plate 16b, as seen in FIG. 11. In this second final setting operation, the guide blocks may be used with a new final setting anvil which has replaced the initial set anvil, although the same anvil may also be utilized. Although the outermost edge 16g (FIG. 11) of the upper fastener plate 16a may be engaged by the second portion 35b on the punch in the initial staple driving operation, it is in the final clenching operation in which the second portion is most effective in compressing the belt with the fastener edge 16g.

Figure 13:
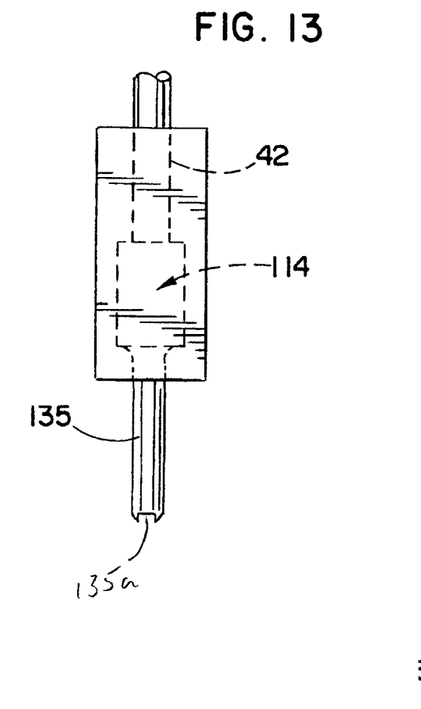
FIG. 13 is a side elevational view of a force applying member having four punches in accordance with a further embodiment.
Figure 14:
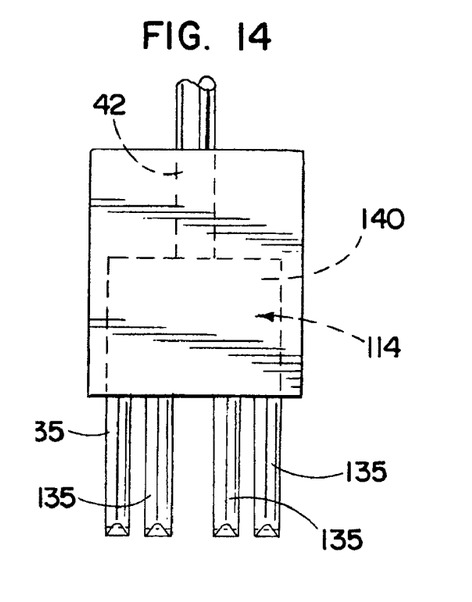
FIG. 14 is an elevational view of the force applying member shown in FIG. 13.

In accordance with another embodiment illustrated in FIGS. 13 and 14, an impact applying member 114 has four punches 135 depending from a main body 140 of the impact applying member for driving four preset staples on a pair of adjacent belt fasteners 16. The four staples are driven by the respective four punches simultaneously into the belt. The punches 135 can have their lower drive ends or surfaces configured similar to those of previously described punches 35 so that the front edge 16g of the respective belt fasteners are driven by a second portion on each punch drive end into the belt as illustrated in FIGS. 11 and 12. Each punch 135 can then also have a contoured surface or first portion of the drive surface which is preferably rounded to engage a staple head, as above described for the punches 35. However, in the preferred and illustrated form, the punches 135 have a groove 135a formed in the lower drive end configured to receive the elongate, upper staple head 20d therein, and thus only engage the staple connector and not the fastener front edge during the staple driving operation.

This multiple, power driven punch operation provides a faster operation than heretofore possible with the prior power systems and does not cause operator fatigue as in the manual system. Manifestly, the number of punches on the impact applying member may be varied from one to a multiple number of punches. Also, while it is preferred to use the power tool 10 for both the initial and final stages of staple bending, the power tool 10 could be used for one stage and a manual operation for the other stage.

Figure 5:
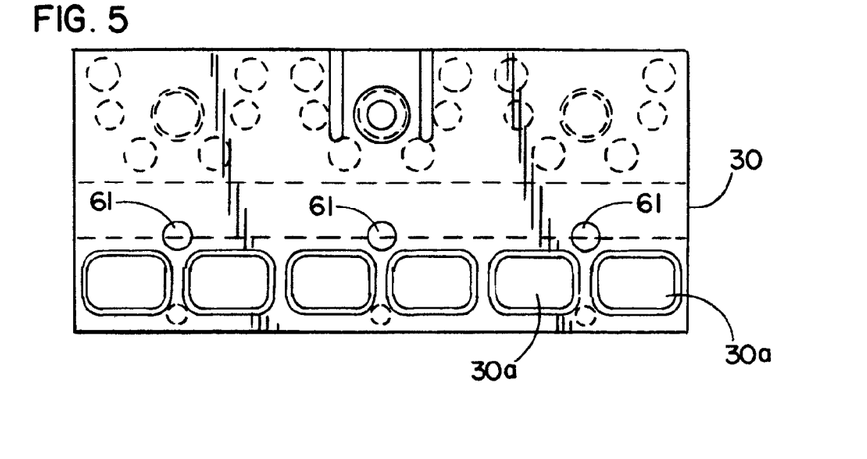
FIG. 5 is a plan view of a guide block.

Turning now in greater detail to the illustrated power tool 10, it comprises a commercially available gun 58 having a trigger mechanism 60 (FIG. 1) and a safety 62 (FIG. 6) that must be actuated to enable the trigger mechanism to be operational to commence a stapling operation. The illustrated safety 62 is in the form of a bar 62a that slides vertically in a bore 65x in the holder or lower sleeve attachment, nose portion 65 of the tool 10. When in its lowermost position, as shown in FIG. 6, the end of the safety rod 62a is slightly recessed within an enlarged opening 65y at the lower end of the bore 65x so that the safety cannot be pushed upwardly except by inserting a projection into the enlarged opening. Herein, a plurality of upstanding projections 61 on the top of guide blocks are spaced and positioned such that safety will be pushed upwardly by one of the projections 61 only when the motor actuator is properly oriented with the punch's second portion 35b aligned with the front edges of the two staples being driven. That is, if the motor actuator is positioned 180° from this proper orientation, the pin projection 61 will abut the lower end of the sleeve because there is no enlarged bore 65y to receive the projection 61 at this orientation. When properly oriented, the enlarged bore 65y will receive the projection 61 which pushes the safety upwards to enable the trigger mechanism to fire the gun and drive the staples. As best seen in FIG. 1 and 5, there are three projections 61 on each guide block 30 for enabling three separate gun firing operations with each operation driving four staples by the pair of punches 35 to attach two belt fasteners at each of the three locations.

Figure 4:
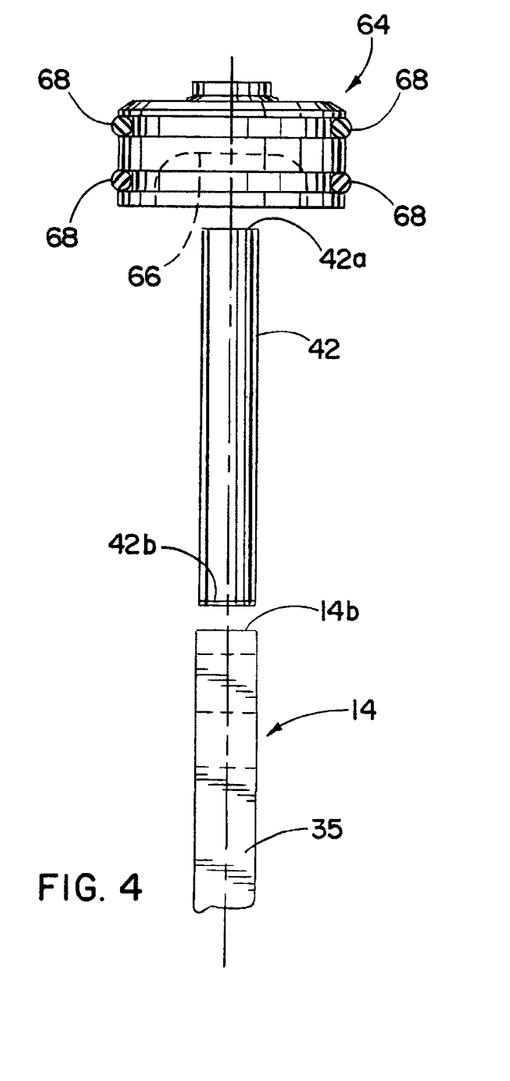
FIG. 4 is a front elevational view of the elements shown in FIG. 3.

Within the motor actuator housing is a cylinder in which is reciprocated a fluid operated piston 64 (FIGS. 3 and 4) that on its downward travel delivers the impact driving force to the punches 35 to drive the staples through the belt and to thereby clinch the belt fasteners to the belt. It has been found that when trying to drive multiple connectors with a power drive system rather than driving a single connector, as is done in the earlier-described prior systems, the load being applied by the punches to their respective connectors generally will not be equal, thereby resulting in offset loads or a moment to one side being generated. Offset loading causes stress concentration at the connection between a long piston rod and to the piston within the power gun. The greater the number of staples and belt fasteners being attached simultaneously, the greater is the likelihood of the occurrence of a stress concentration and failure, which is usually located at the connection between the piston rod and the piston in the usual commercially available gun. For a commercially acceptable system, there should not be a broken piston rod and piston connection after only a limited number of belt splicing operations.

The commercially available gun has been modified because the original equipment piston and attached piston rod experienced a break or failure at the fixed connection of the piston rod to the piston because of stress concentration at this fixed connection, as above described with less than a satisfactory number of use cycles for a commercially successful system. This problem of failure due to stress concentration arises from unequal forces being generated from the first and second punches during a stapling operation; and this problem has been solved by replacing the original piston and attached piston rod with a new piston 64 and the separate floating drive rod 42 which is free floating relative to the piston because there is no fixed connection between the piston and the drive rod 42.

By separating the piston 64 from the drive rod 42, the piston 64 can be driven with more speed by the motor 12 due to its lighter weight over a connected piston and rod assembly. In this manner, the high impact speed with the rod can be transmitted to the impact applying member for applying more force at the punches. Alternatively, the motor 12 need not provide as much power to the piston as to a piston and drive rod assembly while still obtaining substantially the same force at the punches. In this illustrated embodiment, the piston has a flat, impact surface 66 on its bottom side for impacting an upper end 42a of the drive rod 42. The drive rod slides vertically in a bore of the holder or sleeve or nose member 65 fixed to the housing of the actuator gun; and, when driven down by the piston, the lower end of the drive rod impacts the top impact surface 14b on the impact applying member to cause the punches 35 to drive the staples through the belt and the belt fastener.

To provide strength and durability to deliver the impact blow forces from the piston 64 to the upper impact end 42a of the drive rod 42, the original equipment, aluminum piston has been replaced with a steel piston 64 which has the impact blow applying surface 66, which is preferably located generally axially midway between a pair of O-ring seals 68 on the cylindrical skirt wall of the piston. The original equipment, aluminum piston and piston rod were guided by a single O-ring on the piston skirt wall and by a bearing located downwardly on the piston rod and through which the piston rod reciprocated. The substituted steel piston 64 is guided during reciprocation by a pair of axially upper and lower O-ring seals 68 sliding along the cylinder wall. The potential for canting of the piston in the cylinder due to forces between the piston and the upper end of the drive rod during impact therewith, as the drive rod impacts the member 14, and the member's punches 35 impact the staples 20 is lessened by positioning the piston impact surface 66 midway between the O-ring seals. To this end, the bottom of the piston has a cup-shaped recess on its bottom side with the top of the recess having the piston impact surface 66 thereon.

The drive rod 42 is preferably a cylindrically-shaped rod made of steel that has its upper portion projecting above an upper end 65a of the retaining member 65 which is attached to the bottom portion of the gun housing 58. The drive rod 42 extends between its upper end 42a which is in contact with the piston impact surface 66 through a vertical bore 65b in the retaining member to its lower end 42b (FIGS. 6 and 7) which is in contact with the impact surface 14b on the impact applying member 14.

In this illustrated embodiment, the impact applying member 14 is retained on the tool 10, and specifically the retaining member 65 thereof by retention structure, preferably in the form of retaining pin 70 (FIG. 3) which extends through a vertical slot 72 in the main body 40 of the impact applying member 14. The retaining pin is secured at ends thereof to the stationary retaining member 65 which is fixed to the gun housing 58. The impact applying member 14 is driven downwardly by the impact force received from the lower end 42b of the drive rod hitting the horizontal, top impact surface 14b causing the impact applying member to slide down in an enlarged rectangular-shaped, vertical guide slot formed in the body of the retaining member 65 below the drive rod bore thereof, as best seen in FIGS. 3, 6 and 7.

As best seen in FIG. 8, the illustrated staple engaging first portion 35a of the punch 35 on the impact applying member 14 may be formed with multiple curve surfaces smoothly blended into one another to make the smooth continuously curving surface which is illustrated in the drawings. The main first portion's curve comprises a one inch radius curve 35d having its axis located 0.040 in the rearward direction from the central, longitudinal vertical axis through the punch 35. The rearward end of this one inch radius curved surface is rounded off at a curved, lower rearward corner 35e, having a radius of 0.40 inch. A blended, forward curved surface 35f leads to an intersection 35c between the first portion 35a and the depending second portion 35b. The latter has a slanted, flat surface 35g thereon substantially matched to the slant on the outermost end 16g of the belt fastener's upper plate 16a and has a rounded corner nose surface 35h having a radius 0.040 inch. The nose surface 35h of the second impact portion 35b is about 0.036 inch lower than the lowest point of curved surface 35d of the first impact portion 35a.

The illustrated impact applying member 14 has a rectangular-shaped main body with the top flat surface 14a and punches 35 that are about 0.715 inch in width for the sizes of staples being driven thereby. The punches are about 1.5 inch long in height and about 0.475 inch in thickness which is the thickness of the body of the impact member 14. The width of the body is about 1.680 inch the width of a slot between the punches is about 0.250 inch and its height is about 1.586 inch. The above dimensions are provided only by way of example and not by way of limitation, as manifestly, the size and shape of the impact applying member 14 and/or the punches may be varied and still fall within the preview of the appended claims.

The illustrated first and second portions have been found to work satisfactorily for each three different sizes of hinged belt fasteners which may be spliced by the illustrated, power actuated splicing system with minor changes to the system such as different sizes of combs into which the hinge forming ends of the belt fasteners are inserted. A pin may be inserted through the aligned fastener hinges to keep them evenly aligned with the belt edge being spliced as is common in prior splicing systems. Moreover, other shapes for the first and second piston impact portions 35a or 35b may be used from that described herein.

While there has been illustrated and described a particular embodiment of the present invention, it will be appreciated that numerous changes and modifications will occur to those skilled in the art and it is intended in the intended claims to cover all those changes and modifications which follow in the true spirit and scope of the present invention.

What is claimed is:

1. A power driven apparatus for attaching belt fasteners with connectors to a conveyor belt, the apparatus comprising:
   a motor;
   a force applying member power driven by operation of the motor and having a lower engagement end thereon engageable with a connector;

a force applying surface on the lower end of the force applying member with the force applying surface having a non-planar configuration extending between a rear side and a forward side of the force applying member lower end;
a wide, rearward connector driving portion of the force applying surface configured to engage the connector to drive the connector through the belt; and
a narrow, forward fastener driving portion of the force applying surface that is narrower than the wide, rearward connector driving portion and is configured differently therefrom to directly engage a belt fastener without first engaging the connector to drive a portion of the belt fastener toward the belt so that there is distribution of force from the force applying member over both the fastener portion and the connector.

2. An apparatus in accordance with claim 1 wherein:
the force applying surface on the lower end of the force applying member has a contoured shape configured to engage and drive the connector and fastener.

3. An apparatus in accordance with claim 1 wherein the connector is a staple having a pair of legs;
the force applying surface being used with the same motor and force applying member to partially bend ends of the staple legs in an initial stage and then to further bend the staple legs into a clinching position in a final stage.

4. An apparatus in accordance with claim 1 comprising:
a fixture having anvil surfaces thereon for setting ends of the connectors having pierced the belt; and
a guide block positionable on the fixture to align the force applying member with the connector that is to pierce the belt.

5. An apparatus in accordance with claim 4 wherein:
the connectors are prestaked staples mounted in apertures of an upper plate of the belt fastener; and
the guide block having bores sized to receive a preset staple at the lower end of the bore and the force applying member at the upper end of the bore.

6. An apparatus in accordance with claim 1 wherein the force applying member includes a plurality of punches and the force applying surface includes a plurality of impact surfaces at lower ends of the punches for driving multiple connectors substantially simultaneously.

7. An apparatus in accordance with claim 6 wherein the impact applying surfaces of the punches each comprise:
a first impact portion for engaging the connector; and
a second impact portion adjacent the first impact portion and configured to engage and push down an outboard edge of the belt fastener.

8. An apparatus in accordance with claim 7 wherein the second impact portion protrudes below the first impact portion of the impact surface.

9. An apparatus in accordance with claim 8 comprising:
the second impact portion being joined to the first impact portion and being configured to substantially match the configuration of the outboard edge of the belt fastener.

10. An apparatus in accordance with claim 1 wherein the force applying surface is sized to span a pair of adjacent connectors for substantially simultaneously driving the pair of connectors.

11. An apparatus in accordance with claim 10 wherein the force applying member comprises:
a pair of punches each having the force applying surfaces for substantially simultaneously driving four connectors.

12. An apparatus in accordance with claim 1 wherein there are two punches on the force applying member, each having a force applying surface configured to engage a connector and to engage a belt fastener and to substantially simultaneously drive both of connectors into the belt.

13. An apparatus in accordance with claim 1 comprising:
four punches on the force applying member for simultaneously driving four connectors into the belt.

14. A power driven apparatus for attaching belt fasteners with connectors to a conveyor belt, the apparatus comprising:
a motor;
a force applying member power driven by operation of the motor and having a lower engagement end thereon engageable with a connector;
a force applying surface on the lower end of the force applying member configured to engage the connector to drive the connector through the belt and configured to directly engage a belt fastener to drive a portion of the belt fastener toward the belt so that there is distribution of force from the force applying member over both the fastener portion and the connector,
wherein the force applying surface on the lower end of the force applying member has a contoured shape configured to engage and drive the connector and fastener, and
the contoured shape of the force applying surface comprises:
a curved surface portion configured to drive the connector; and
a depending surface portion adjacent the curved surface portion and configured to drive the belt fastener toward the belt.

15. A power driven apparatus for attaching belt fasteners with connectors to a conveyor belt, the apparatus comprising:
a motor;
a force applying member power driven by operation of the motor and having a lower engagement end thereon engageable with a connector;
a force applying surface on the lower end of the force applying member configured to engage the connector to drive the connector through the belt and configured to directly engage a belt fastener to drive a portion of the belt fastener toward the belt so that there is distribution of force from the force applying member over both the fastener portion and the connector; and
a reciprocal piston and a drive rod that is a separate and discrete from the piston and the force applying member, the piston impacting an upper end of the drive rod and a lower end of the drive rod impacting one end of the force applying member upon operation of the motor.

16. A power driven apparatus for attaching belt fasteners with connectors to a conveyor belt, the apparatus comprising:
a motor;
a force applying member power driven by operation of the motor and having a lower engagement end thereon engageable with a connector; and
a force applying surface on the lower end of the force applying member configured to engage the connector to drive the connector through the belt and configured to directly engage a belt fastener to drive a portion of the belt fastener toward the belt so that there is distribution of force from the force applying member over both the fastener portion and the connector,
wherein the force applying surface is configured with a curved surface to push and drive the connector substantially straight through at least one hole in a fastener lower plate without misfire despite inclinations of the impact applying member relative to the connector.

* * * * *